(12) United States Patent
Watanabe et al.

(10) Patent No.: US 9,925,937 B2
(45) Date of Patent: Mar. 27, 2018

(54) VEHICLE FRONT PORTION STRUCTURE

(71) Applicants: Toyota Jidosha Kabushiki Kaisha, Toyota-shi (JP); Aisin Takaoka Co., Ltd., Toyota-shi (JP)

(72) Inventors: Ryosuke Watanabe, Toyota (JP); Tatsuya Komamura, Toyota (JP); Yasunori Iwamoto, Toyota (JP); Ikuto Hirai, Nagakute (JP)

(73) Assignees: TOYOTA JIDOSHA KABUSHIKI KAISHA, Toyota-shi (JP); AISIN TAKAOKA CO., LTD., Toyota-shi (JP)

( * ) Notice: Subject to any disclaimer, the term of this patent is extended or adjusted under 35 U.S.C. 154(b) by 0 days.

(21) Appl. No.: 15/068,746

(22) Filed: Mar. 14, 2016

(65) Prior Publication Data

US 2016/0332588 A1 Nov. 17, 2016

(30) Foreign Application Priority Data

May 12, 2015 (JP) ................. 2015-097219

(51) Int. Cl.
*B60R 19/26* (2006.01)
*B60R 19/24* (2006.01)

(52) U.S. Cl.
CPC ........ *B60R 19/24* (2013.01); *B60R 2019/247* (2013.01)

(58) Field of Classification Search
CPC . B60R 2021/0023; B60R 19/24; B60R 19/26; B62D 25/2018; B62D 21/152; B62D 21/155; B62D 25/085

(Continued)

(56) References Cited

U.S. PATENT DOCUMENTS 8,496,287 B2 * 7/2013 Matsuura ................ B60R 19/34
293/132
8,608,231 B1 * 12/2013 Mendivil ................ B60R 19/34
293/133

(Continued)

FOREIGN PATENT DOCUMENTS

EP 2 415 643 A1 2/2012
JP 2010-125884 6/2010

(Continued)

*Primary Examiner* — Hilary L Gutman
(74) *Attorney, Agent, or Firm* — Oblon, McClelland, Maier & Neustadt, L.L.P.

(57) ABSTRACT

A vehicle front portion structure includes: a front side member; a load-bearing member provided at an outer side face of a vehicle width direction outer side of the front side member, the load-bearing member including a load transmission portion that protrudes to the vehicle width direction outer side and to a vehicle front from the outer side face; a front bumper reinforcement; an inner side collision-absorbing portion that couples a front end of the front side member with the front bumper reinforcement; and an outer side collision-absorbing portion disposed at the vehicle width direction outer side of the inner side collision-absorbing portion, at least a portion of the outer side collision-absorbing portion being disposed between a front end of the load transmission portion and the front bumper reinforcement, and the outer side collision-absorbing portion being higher in compression strength in the vehicle front-and-rear direction than the inner side collision-absorbing portion.

8 Claims, 7 Drawing Sheets

(58) Field of Classification Search
USPC .............. 296/187.1, 187.09, 193.09, 203.02
See application file for complete search history.

(56) References Cited

U.S. PATENT DOCUMENTS

| | | | | |
|---|---|---|---|---|
| 8,764,096 B2* | 7/2014 | Han | ........................ | B60R 19/18 296/133 |
| 9,027,695 B2* | 5/2015 | Nakamura | ............ | B62D 21/155 180/247 |
| 9,266,484 B2* | 2/2016 | Nakanishi | ................ | B60R 19/34 |
| 9,315,167 B1* | 4/2016 | Hardy | ..................... | B60R 19/04 |
| 9,446,725 B2* | 9/2016 | Yamada | ................ | B62D 21/152 |
| 9,555,756 B2* | 1/2017 | Sugano | ................... | B60R 19/04 |
| 2010/0127531 A1* | 5/2010 | Yasuhara | ............. | B62D 21/152 296/187.09 |
| 2011/0148151 A1* | 6/2011 | Abe | ........................ | B60R 19/34 296/203.02 |
| 2014/0062106 A1* | 3/2014 | Han | ........................ | B60R 19/34 293/133 |
| 2014/0117717 A1* | 5/2014 | Parkila | .................... | B60R 19/24 296/187.09 |
| 2015/0014084 A1* | 1/2015 | Iwama | ................. | B62D 25/082 180/312 |
| 2015/0069785 A1* | 3/2015 | Sakakibara | ........... | B62D 25/085 296/187.1 |
| 2015/0360632 A1* | 12/2015 | Nishida | ................. | B62D 21/152 293/133 |
| 2016/0264178 A1* | 9/2016 | Ito | ........................ | B62D 21/152 |
| 2016/0318552 A1* | 11/2016 | Matsumoto | ............ | B62D 25/08 |
| 2017/0066395 A1* | 3/2017 | Ito | ............................ | B60R 19/04 |

FOREIGN PATENT DOCUMENTS

| | | |
|---|---|---|
| JP | 2012-35704 | 2/2012 |
| JP | 2014-58190 A | 4/2014 |
| JP | 2014-113893 A | 6/2014 |

* cited by examiner

VEHICLE FRONT PORTION STRUCTURE

CROSS-REFERENCE TO RELATED APPLICATION

This application is based on and claims priority under 35 USC 119 from Japanese Patent Application No. 2015-097219 filed on May 12, 2015, the disclosure of which is incorporated by reference herein.

BACKGROUND

Technical Field

The present invention relates to a vehicle front portion structure.

Related Art

There is a vehicle front portion structure (for example, see Japanese Patent Application Laid-Open (JP-A) Nos. 2010-125884 and 2010-035704) that is provided with a front side member, a lower frame, and a collision-absorbing member. The front side member is disposed at a vehicle width direction outer side of a power unit. The lower frame is disposed at the vehicle width direction outer side of the front side member. The collision-absorbing member couples the front side member and the lower frame with a front bumper reinforcement.

However, there may be an offset collision by a collision body against a vehicle front face at the vehicle width direction outer side relative to the front side member (hereinafter referred to as a "micro-wrap collision"). In this case, it may not be possible for a collision load that is inputted from the collision body to the front bumper reinforcement to be adequately borne by the front side member.

As an example of a countermeasure, providing a load-bearing member that protrudes to the vehicle width direction outer side at an outer side face of the front side member has been considered; a collision load associated with a micro-wrap collision is borne by this load-bearing member. In this case, the collision load is transmitted through the load-bearing member to the outer side face of the front side member. Hence, if the front side member inflects to the vehicle width direction inner side and touches against the power unit, the collision load is dispersed and transmitted through the power unit to a front side member and the like at the opposite side of the power unit from the side at which the collision body is disposed. Consequently, collision performance with respect to micro-wrap collisions is improved.

However, a collision load that is inputted to the front bumper reinforcement in association with a micro-wrap collision is also transmitted through the collision-absorbing member to the front end of the front side member. As a result, the collision load that is transmitted from the front bumper reinforcement through the collision-absorbing member to the load-bearing member is reduced, and the front side member may tend to inflect less to the vehicle width direction inner side.

SUMMARY

In consideration of the circumstances described above, an object of the present invention is to provide a vehicle front portion structure that may efficiently transmit a collision load that is inputted to a front bumper reinforcement in association with a micro-wrap collision to a load-bearing member.

A vehicle front portion structure according to a first aspect includes: a front side member disposed along a vehicle front-and-rear direction at a vehicle width direction outer side of a power unit; a load-bearing member provided at an outer side face of a vehicle width direction outer side of the front side member, the load-bearing member including a load transmission portion that protrudes to the vehicle width direction outer side and to a vehicle front from the outer side face; a front bumper reinforcement disposed along the vehicle width direction at a vehicle front of the front side member and the load-bearing member; an inner side collision-absorbing portion that couples a front end of the front side member with the front bumper reinforcement; and an outer side collision-absorbing portion disposed at the vehicle width direction outer side of the inner side collision-absorbing portion, at least a portion of the outer side collision-absorbing portion being disposed between a front end of the load transmission portion and the front bumper reinforcement, and the outer side collision-absorbing portion being higher in compression strength in the vehicle front-and-rear direction than the inner side collision-absorbing portion.

According to the aspect described above, when a collision load is inputted to the front bumper reinforcement in association with a micro-wrap collision, the following occurs. The collision load inputted to the front bumper reinforcement is transmitted through the inner side collision-absorbing portion to the front end of the front side member and is transmitted through the outer side collision-absorbing portion to the front end of the load transmission portion of the load-bearing member. At this time, collision energy is absorbed by the inner side collision-absorbing portion and the outer side collision-absorbing portion compressively deforming in the vehicle front-and-rear direction.

The collision load that is transmitted to the front end of the load transmission portion is then transmitted through the load transmission portion to the outer side face of the front side member. Hence, if the front side member inflects to the vehicle width direction inner side and touches against the power unit, the collision load is dispersed and transmitted through the power unit to a front side member and the like at the opposite side of the power unit from the side at which the collision body is disposed. Thus, collision performance with respect to micro-wrap collisions is improved.

The compression strength in the vehicle front-and-rear direction of the outer side collision-absorbing portion according to the present aspect is higher than that of the inner side collision-absorbing portion. Therefore, a collision load that is inputted to the front bumper reinforcement in association with a micro-wrap collision is concentrated in and transmitted through the outer side collision-absorbing portion more than the inner side collision-absorbing portion. Therefore, in the present aspect, a collision load that is transmitted from the front bumper reinforcement through the outer side collision-absorbing portion to the front end of the load transmission portion is larger than in a structure in which an inner side collision-absorbing portion and an outer side collision-absorbing portion have equal compression strength in the vehicle front-and-rear direction. As a result, the front side member tends to inflect more to the vehicle width direction inner side. Hence, collision performance with respect to micro-wrap collisions is further improved.

In a vehicle front portion structure according to a second aspect, in the vehicle front portion structure according to the first aspect, the inner side collision-absorbing portion and the outer side collision-absorbing portion are connected to one another in the vehicle width direction, a cross-sectional shape of the inner side collision-absorbing portion and the outer side collision-absorbing portion viewed in the vehicle front-and-rear direction constituting a closed cross-section that extends across the front end of the front side member and the front end of the load transmission portion.

According to the aspect described above, the inner side collision-absorbing portion and the outer side collision-absorbing portion are connected to one another in the vehicle width direction. As a result, the cross-sectional shape as viewed in the vehicle front-and-rear direction constitutes the closed cross-section extending across the front end of the front side member and the front end of the load transmission portion. Therefore, compared to a structure in which an inner side collision-absorbing portion and an outer side collision-absorbing portion are formed as separate bodies, in the present aspect an absorption amount of collision energy by the inner side collision-absorbing portion and the outer side collision-absorbing portion may be assured even while a number of components is reduced.

In a vehicle front portion structure according to a third aspect, in the vehicle front portion structure according to the second aspect, the outer side collision-absorbing portion includes a partition wall portion that extends in the vehicle front-and-rear direction and partitions an interior of the closed cross-section into a plurality of spaces in the vehicle width direction.

According to the aspect described above, the outer side collision-absorbing portion includes the partition wall portion that extends in the vehicle front-and-rear direction. The partition wall portion partitions the interior of the closed cross-section constituted by the outer side collision-absorbing portion and the inner side collision-absorbing portion into the plural spaces in the vehicle width direction. Because of this partition wall portion, the compression strength in the vehicle front-and-rear direction of the outer side collision-absorbing portion may be made higher than the compression strength in the vehicle front-and-rear direction of the inner side collision-absorbing portion by a simple structure.

In a vehicle front portion structure according to a fourth aspect, in the vehicle front portion structure according to any one of the first to third aspects, the front end of the load transmission portion is disposed at a vehicle rear of an outer side wall portion of the vehicle width direction outer side of the outer side collision-absorbing portion.

According to the aspect described above, the front end of the load transmission portion is disposed to the vehicle rear of the outer side wall portion of the vehicle width direction outer side of the outer side collision-absorbing portion. Thus, a collision load that is inputted to the front bumper reinforcement in association with a micro-wrap collision is transmitted through the outer side wall portion of the outer side collision-absorbing portion to the front end of the load transmission portion. Therefore, a transmission efficiency of the collision load being transmitted through the outer side collision-absorbing portion to the load transmission portion is improved.

In a vehicle front portion structure according to a fifth aspect, in the vehicle front portion structure according to the fourth aspect, a protrusion portion is provided at an end portion of a vehicle width direction outer side of the front bumper reinforcement, the protrusion portion protruding to the vehicle front, and a front face of the protrusion portion being a flat surface that extends in the vehicle up-and-down direction and the vehicle width direction, and the front face of the protrusion portion, the outer side collision-absorbing portion, and the front end of the load transmission portion are arranged in line in the vehicle front-and-rear direction.

According to the aspect described above, the protrusion portion that protrudes to the vehicle front is provided at the end portion of the vehicle width direction outer side of the front bumper reinforcement. The front face of the protrusion portion is formed as the flat surface that extends in the vehicle up-and-down direction and the vehicle width direction. Therefore, in the present aspect, a collision object may be received by the front face of the protrusion portion more efficiently than in a structure in which a front face of a protrusion portion is angled relative to the vehicle up-and-down direction or the vehicle width direction.

The front face of the protrusion portion, the outer side collision-absorbing portion, and the front end of the load transmission portion are arranged in line in the vehicle front-and-rear direction. Therefore, a collision load that is inputted to the front face of the protrusion portion is efficiently transmitted through the outer side collision-absorbing portion and the load transmission portion to the outer side face of the front side member. As a result, the front side member tends to inflect more to the vehicle width direction inner side. Hence, collision performance with respect to micro-wrap collisions is further improved.

In a vehicle front portion structure according to a sixth aspect, the vehicle front portion structure according to any one of the first to fifth aspects further includes a bracket that extends to the vehicle width direction outer side from the front end of the front side member, wherein: the load-bearing member includes a projection portion that, viewed in the vehicle up-and-down direction, projects to the vehicle width direction outer side from the outer side face of the front side member, and that is disposed with a gap between a front end of the projection portion and the bracket, and the load transmission portion is an outer wall portion of the vehicle width direction outer side of the load-bearing member, the front end of the load transmission portion protrudes to the vehicle front relative to the front end of the projection portion, and the front end of the load transmission portion abuts against the bracket.

According to the aspect described above, the load-bearing member includes the projection portion that projects to the vehicle width direction outer side from the outer side face of the front side member as viewed in the vehicle up-and-down direction. The projection portion is disposed with a gap between the front end of the projection portion and the bracket that protrudes to the vehicle width direction outer side from the front end of the front side member. The load transmission portion is formed as the outer wall portion of the vehicle width direction outer side of the load-bearing member. The front end of this outer wall portion protrudes further to the vehicle front than the front end of the projection portion and abuts against the bracket.

Therefore, a collision load that is transmitted through the outer side collision-absorbing portion to the bracket in association with a micro-wrap collision is transmitted to the front end of the outer wall portion that is the load transmission portion before being transmitted to the projection portion of the load-bearing member. Thus, the collision load is efficiently transmitted from the outer side collision-absorbing portion to the outer wall portion of the load-bearing member. As a result, the front side member tends to inflect even more to the vehicle width direction inner side.

In a vehicle front portion structure according to a seventh aspect, in the vehicle front portion structure according to any one of the first to sixth aspects, a number of ridge lines extending in the vehicle front-and-rear direction is greater at the outer side collision-absorbing portion than at the inner side collision-absorbing portion.

According to the aspect described above, the outer side collision-absorbing portion has a larger number of ridge lines extending in the vehicle front-and-rear direction than the inner side collision-absorbing portion. Thus, the compression strength in the vehicle front-and-rear direction of the outer side collision-absorbing portion may be made higher than the compression strength in the vehicle front-and-rear direction of the inner side collision-absorbing portion by a simple structure.

In a vehicle front portion structure according to an eighth aspect, in the vehicle front portion structure according to any one of the first to seventh aspects, a plate thickness is greater at the outer side collision-absorbing portion than at the inner side collision-absorbing portion.

According to the aspect described above, the outer side collision-absorbing portion has a greater plate thickness than the inner side collision-absorbing portion. Thus, the compression strength in the vehicle front-and-rear direction of the outer side collision-absorbing portion may be made higher than the compression strength in the vehicle front-and-rear direction of the inner side collision-absorbing portion by a simple structure.

As described above, according to the vehicle front portion structure in accordance with the present invention, a collision load that is inputted to the front bumper reinforcement in association with a micro-wrap collision may be efficiently transmitted to the load-bearing member.

BRIEF DESCRIPTION OF THE DRAWINGS

Exemplary embodiments of the present invention will be described in detail based on the following figures, wherein.

DETAILED DESCRIPTION

Figure 1:
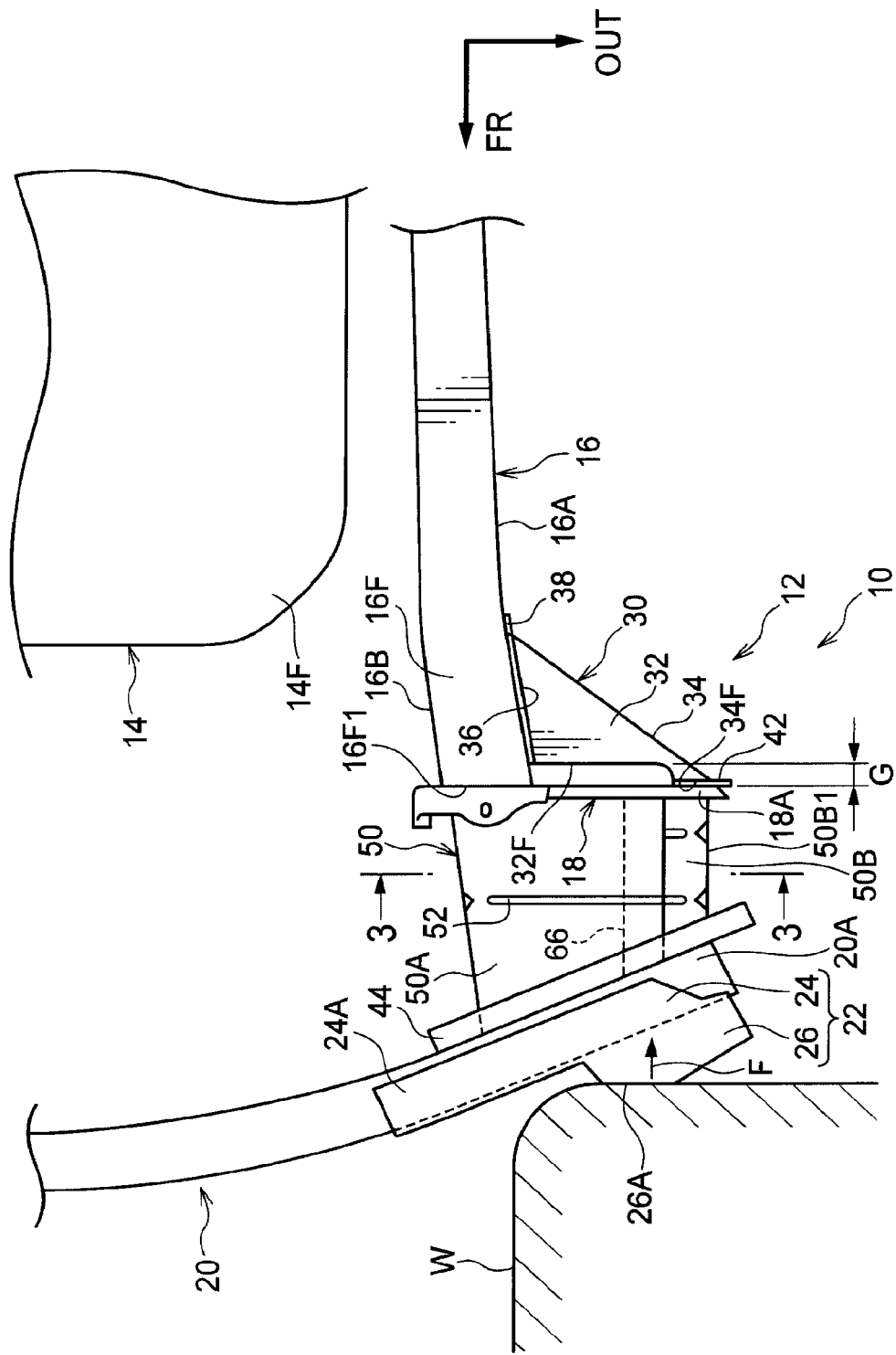
FIG. 1 is a plan view, viewed from a vehicle upper side, of a vehicle front portion in which a vehicle front portion structure in accordance with an exemplary embodiment is employed.

Herebelow, the vehicle front portion structure is described in relation to an exemplary embodiment of the present invention while referring to the attached drawings. Herein, the arrow UP that is shown in the drawings indicates a vehicle up-and-down direction upper side (vehicle upper side), the arrow FR indicates a vehicle front-and-rear direction front side (vehicle front), and the arrow OUT indicates a vehicle width direction outer side (vehicle body left side).

FIG. 1 shows a vehicle front portion 12 in which a vehicle side portion structure 10 according to the present exemplary embodiment is employed. As shown in FIG. 1, the vehicle front portion 12 is provided with a power unit 14, a pair of front side members 16 and a front bumper reinforcement 20. The front side members 16 are disposed at the two vehicle width direction sides of the power unit 14. The front bumper reinforcement 20 is disposed at the vehicle front side of the power unit 14.

In the present exemplary embodiment, the vehicle front portion 12 is structured with left-right symmetry with respect to the vehicle width direction central portion. Accordingly, the structure of the left side of the vehicle front portion 12 is described below but the structure of the right side of the vehicle front portion 12 is not described. Structures are also possible in which the vehicle front portion 12 is asymmetrical between left and right with respect to the vehicle width direction central portion.

The power unit 14 is a power source that drives one or both of front wheels and rear wheels of the vehicle, which are not shown in the drawings, to turn. The power unit 14 includes, for example, one or both of an internal combustion engine (an "engine") and an electric motor. The power unit 14 is supported at the pair of front side members 16 via mounting brackets, which are not shown in the drawings, at a central portion in a length direction of the front side members 16. A cabin (a passenger compartment), which is not shown in the drawings, is provided to the vehicle rear of the power unit 14.

The pair of front side members 16 serve as framework members, fabricated of metal, that structure a frame at both of side portions of the vehicle front portion 12. Each front side member 16 is disposed along the vehicle front-and-rear direction at a vehicle width direction outer side of the power unit 14. A cross-sectional shape of the front side member 16 viewed in the vehicle front-and-rear direction constitutes a rectangular closed cross-section. A bracket 18 is provided at a front end 16F1 at the vehicle front side of the front side member 16. The bracket 18 protrudes to the vehicle width direction outer side from the front end 16F1 of the front side member 16. The front bumper reinforcement 20 is disposed to the vehicle front of the brackets 18.

The front bumper reinforcement (hereinafter referred to as "the front bumper RF") 20 is disposed along the vehicle width direction at the front end side of the vehicle front portion 12. The front bumper RF 20 is a member fabricated of metal, a cross-sectional shape of which viewed in the vehicle width direction constitutes a rectangular closed cross-section. Viewed in the vehicle up-and-down direction, the front bumper RF 20 is gently curved so as to form a protrusion to the vehicle front. An end portion 20A of each vehicle width direction outer side of the front bumper RF 20 protrudes further to the vehicle width direction outer side than the front side member 16.

A reinforcing member 22 fabricated of metal is provided at the end portion 20A of the front bumper RF 20. The reinforcing member 22 includes a base portion 24 and a protrusion portion 26. The base portion 24 extends in the vehicle width direction along the end portion 20A of the front bumper RF 20. A cross-sectional shape of the base portion 24 viewed in the vehicle width direction constitutes a "C" shape, the vehicle rear side of which is open. The base portion 24 is joined by welding or the like to the front bumper RF 20 in a state in which the base portion 24 covers the end portion 20A of the front bumper RF 20 from the vehicle front side. An inner end portion 24A of the vehicle width direction inner side of the base portion 24 protrudes further to the vehicle width direction inner side than a bracket 44 and a collision-absorbing member 50, which are described below. The end portion 20A of the front bumper RF 20 is reinforced by the base portion 24.

The protrusion portion 26 is formed integrally with the base portion 24. The protrusion portion 26 protrudes to the vehicle front from the base portion 24 provided at the end portion 20A of the front bumper RF 20. A front face 26A of the protrusion portion 26 in the protrusion direction thereof (at the vehicle front) serves as a receiving surface that receives a collision body W that collides with the end portion 20A of the front bumper RF 20 in association with a micro-wrap collision. The front face 26A is formed as a flat surface that extends in the vehicle up-and-down direction and the vehicle width direction.

A load-bearing member 30, which is fabricated of metal, is provided at a front end portion 16F of the vehicle front side of the front side member 16. The load-bearing member 30 is mounted at an outer side face 16A of the vehicle width direction outer side of the front end portion 16F of the front side member 16 in a state in which the load-bearing member 30 projects to the vehicle width direction outer side from the outer side face 16A, as viewed in the vehicle up-and-down direction. The front bumper RF 20 is disposed to the vehicle front of the load-bearing member 30 and the front side member 16. The load-bearing member 30 is disposed at a location that is separated to the vehicle rear from the bracket 18. A cross-sectional shape of the load-bearing member 30 viewed in the vehicle front-and-rear direction is formed in a hat shape, the vehicle width direction inner side of which is open.

Figure 2:
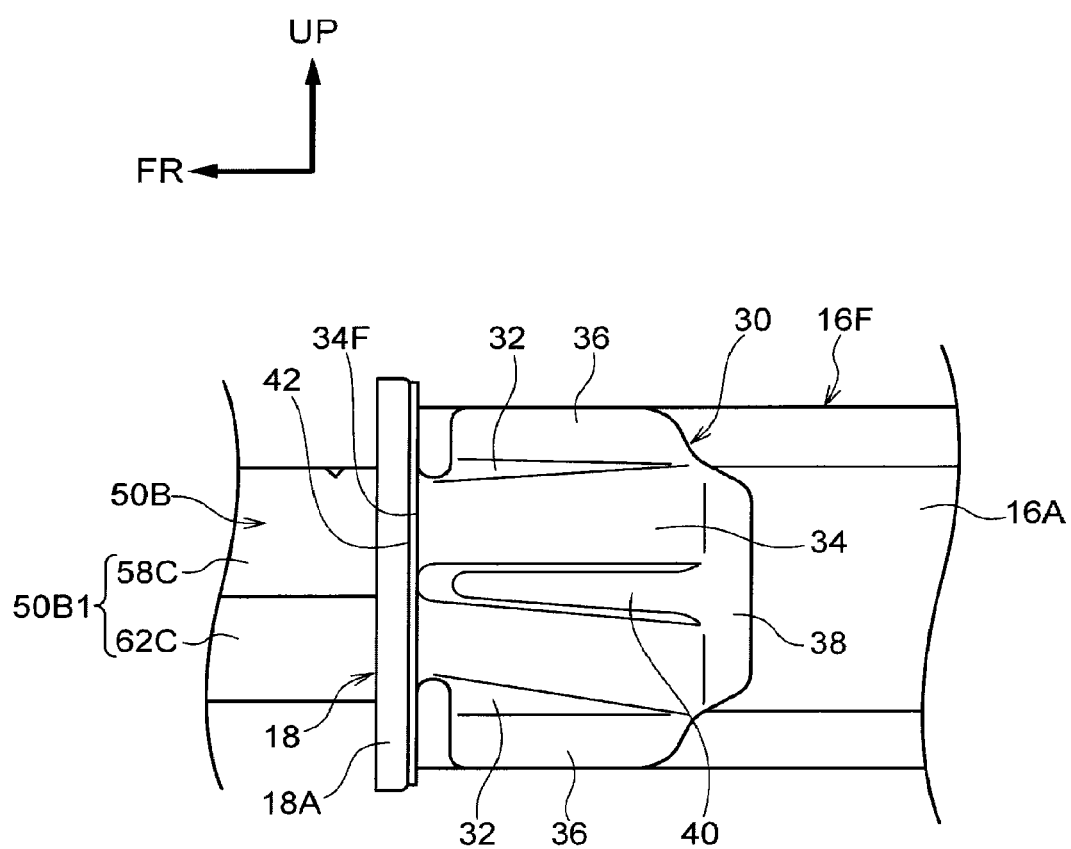
FIG. 2 is a side view, viewed from a vehicle width direction outer side, of a collision-absorbing member shown in FIG. 1.

As shown in FIG. 1 and FIG. 2, the load-bearing member 30 includes a pair of projection portions 32 and an outer wall portion 34. The pair of projection portions 32 are disposed to oppose one another in the vehicle up-and-down direction, forming an upper wall portion and a lower wall portion, respectively, of the load-bearing member 30. The pair of projection portions 32 are formed in triangular shapes (substantially in right-angled triangle shapes) as viewed in the vehicle up-and-down direction.

Respective flange portions 36 are provided at inner ends at the vehicle width direction inner side of the pair of projection portions 32. The flange portions 36 are superposed with the outer side face 16A of the front side member 16. The flange portions 36 are joined to the outer side face 16A of the front side member 16 by bolts, welding or the like.

As shown in FIG. 1, a front end 32F at the vehicle front side of each projection portion 32 protrudes from the outer side face 16A of the front side member 16 to the vehicle width direction outer side, along the bracket 18. The projection portion 32 is disposed in a state in which a gap G is opened between the front end 32F and the bracket 18.

The outer wall portion 34, which serves as a load transmission portion, is disposed at the vehicle width direction outer side of the load-bearing member 30 and connects outer ends (diagonal edges) at the vehicle width direction outer side of the pair of projection portions 32 with one another in the vehicle up-and-down direction. The outer wall portion 34 protrudes to the vehicle width direction outer side and the vehicle front side, from the outer side face 16A of the front side member 16 toward an end portion 18A of the vehicle width direction outer side of the bracket 18. In other words, the outer wall portion 34 protrudes to the vehicle rear and the vehicle width direction inner side from the end portion 18A of the bracket 18 toward the outer side face 16A of the front side member 16.

The power unit 14 is disposed on an extension line that extends along the outer wall portion 34 and then to the vehicle width direction inner side and the vehicle rear.

A flange portion 38 is provided at a rear end at the vehicle rear side of the outer wall portion 34. The flange portion 38 is superposed with the outer side face 16A of the front side member 16. The flange portion 38 is joined by bolts, welding or the like to the outer side face 16A of the front side member 16. As shown in FIG. 2, a bead 40 is formed at a vehicle up-and-down direction central portion of the outer wall portion 34. Viewed from the vehicle width direction outer side, the bead 40 extends in the vehicle front-and-rear direction. A compression strength in the vehicle front-and-rear direction of the outer wall portion 34 as viewed from the vehicle width direction outer side is increased by the bead 40.

A front end 34F at the vehicle front side of the outer wall portion 34 protrudes to the vehicle front relative to the front end 32F of the projection portions 32 and is lined up in the vehicle width direction with the front end 16F1 of the front side member 16. The front end 34F of the outer wall portion 34 abuts against a rear face at the vehicle rear side of the bracket 18. More specifically, a flange portion 42 is provided at the front end 34F of the outer wall portion 34 and is superposed with the rear face of the end portion 18A of the vehicle width direction outer side of the bracket 18. The flange portion 42 is joined to the end portion 18A of the bracket 18 by bolts, welding or the like.

The collision-absorbing member 50, which is fabricated of metal, is provided at a front face at the vehicle front side of the bracket 18. The collision-absorbing member 50 compressively deforms in the vehicle front-and-rear direction (an axial direction thereof) and absorbs collision energy in association with a vehicle frontal collision. A front end at the vehicle front side of the collision-absorbing member 50 is joined to the front bumper RF 20 via the bracket 44. The front end of the collision-absorbing member 50 and the bracket 44 are angled relative to the vehicle width direction, to run along the front bumper RF 20. The front end 16F1 of the front side member 16 and the front bumper RF 20 are coupled in the vehicle front-and-rear direction by the collision-absorbing member 50. In addition, the front end 34F of the outer wall portion 34 of the load-bearing member 30 and the front bumper RF 20 are coupled in the vehicle front-and-rear direction by the collision-absorbing member 50. A bead 52 or the like that originates a compressive deformation in the vehicle front-and-rear direction is formed at the collision-absorbing member 50 as appropriate.

Figure 3:
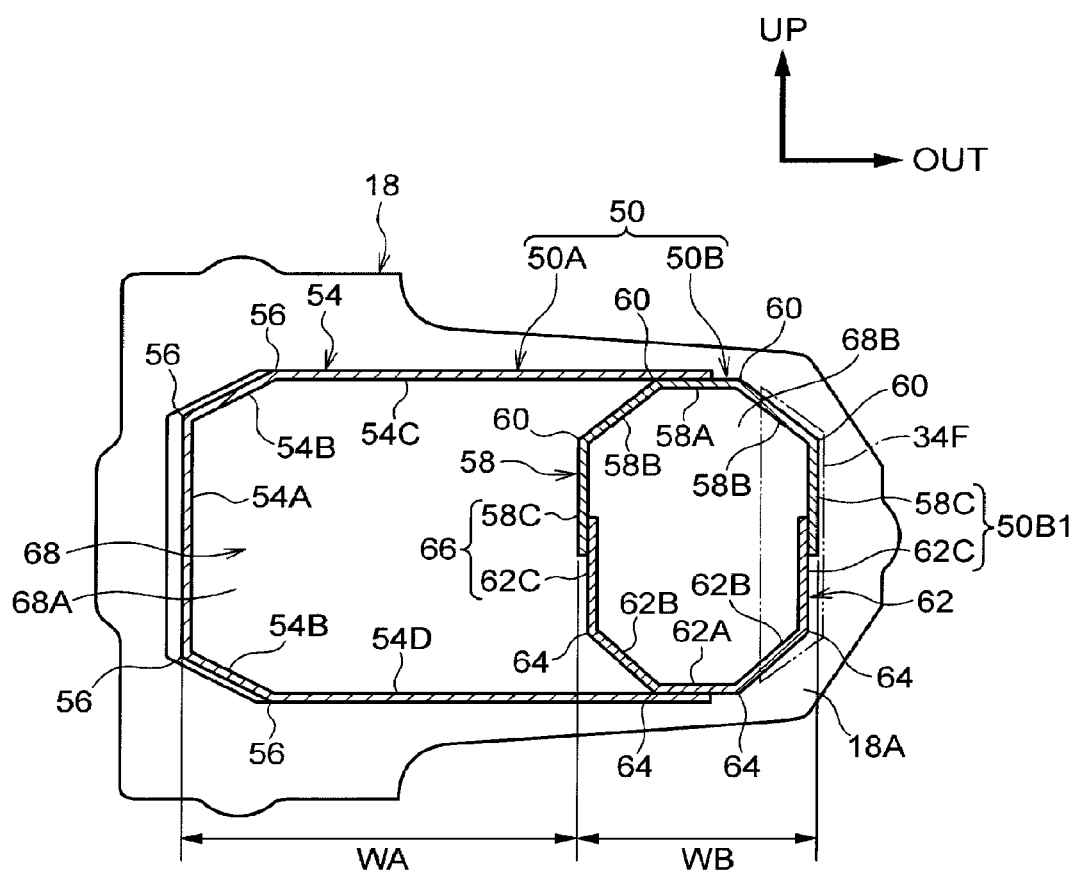
FIG. 3 is a magnified sectional diagram cut along line 3-3 in FIG. 1.

As shown in FIG. 3, a cross-sectional shape of the collision-absorbing member 50 viewed in the vehicle front-and-rear direction constitutes a closed cross-section in a rectangular shape whose length direction is in the vehicle width direction. The collision-absorbing member 50 includes an inner side collision-absorbing portion 50A and an outer side collision-absorbing portion 50B, which are side by side in the vehicle width direction. As shown in FIG. 1, a portion at the vehicle width direction outer side of the inner side collision-absorbing portion 50A is disposed between the front end 16F1 of the front side member 16 and the front bumper RF 20. This portion at the vehicle width direction outer side of the inner side collision-absorbing portion 50A couples the front end 16F1 of the front side member 16 with the front bumper RF 20 in the vehicle front-and-rear direction.

Meanwhile, a portion at the vehicle width direction outer side of the outer side collision-absorbing portion 50B is disposed between the front end 34F of the outer wall portion 34 of the load-bearing member 30 and the front bumper RF 20. This portion at the vehicle width direction outer side of the outer side collision-absorbing portion 50B couples the front end 34F of the outer wall portion 34 with the front bumper RF 20 in the vehicle front-and-rear direction. The outer side collision-absorbing portion 50B is higher in compression strength (compression endurance) and compression stiffness in the vehicle front-and-rear direction than the inner side collision-absorbing portion 50A. In the descriptions below, unless specifically stated otherwise, the term "compression strength" means compression strength in the vehicle front-and-rear direction.

As shown in FIG. 3, a cross-sectional shape of the inner side collision-absorbing portion 50A viewed in the vehicle front-and-rear direction is formed by an inner panel 54 that forms a "C" shape in cross-section, the vehicle width direction outer side of which is open. The inner panel 54 includes a side wall portion 54A and a pair of an upper wall portion 54C and a lower wall portion 54D. The side wall portion 54A is disposed at the vehicle width direction inner side. The upper wall portion 54C and lower wall portion 54D respectively protrude to the vehicle width direction outer side from two vehicle up-and-down direction end portions of the side wall portion 54A, via respective angled wall portions 54B.

The side wall portion 54A is disposed in line with an inner side face 16B of the front side member 16 in the vehicle front-and-rear direction (see FIG. 1). Ridge lines 56 that extend in the vehicle front-and-rear direction are formed at respective connection portions between the side wall portion 54A and the angled wall portions 54B. Further ridge lines 56 that extend in the vehicle front-and-rear direction are formed at respective connection portions between the angled wall portions 54B and the pair of the upper wall portion 54C and the lower wall portion 54D.

A cross-sectional shape of the outer side collision-absorbing portion 50B viewed in the vehicle front-and-rear direction constitutes a rectangular closed cross-section. The outer side collision-absorbing portion 50B is divided in the vehicle up-and-down direction, including a pair of an upper panel 58 and a lower panel 62. In the present exemplary embodiment, the cross-sectional shape of the outer side collision-absorbing portion 50B viewed in the vehicle front-and-rear direction is formed in an octagonal shape.

A cross-sectional shape of the upper panel 58 viewed in the vehicle front-and-rear direction constitutes a "C" shape of which the vehicle lower side is open. The upper panel 58 includes an upper wall portion 58A and a pair of side wall portions 58C. The upper wall portion 58A is disposed at the vehicle upper side. The side wall portions 58C respectively protrude to the vehicle lower side from two vehicle width direction end portions of the upper wall portion 58A, via respective angled wall portions 58B. Ridge lines 60 that extend in the vehicle front-and-rear direction are formed at respective connection portions between the upper wall portion 58A and the angled wall portions 58B. Further ridge lines 60 that extend in the vehicle front-and-rear direction are formed at respective connection portions between the angled wall portions 58B and the pair of side wall portions 58C.

A cross-sectional shape of the lower panel 62 viewed in the vehicle front-and-rear direction constitutes a "C" shape of which the vehicle upper side is open. The lower panel 62 includes a lower wall portion 62A and a pair of side wall portions 62C. The lower wall portion 62A is disposed at the vehicle lower side. The side wall portions 62C respectively protrude toward the vehicle upper side from two vehicle width direction end portions of the lower wall portion 62A, via respective angled wall portions 62B. Ridge lines 64 that extend in the vehicle front-and-rear direction are formed at respective connection portions between the lower wall portion 62A and the angled wall portions 62B. Further ridge lines 64 that extend in the vehicle front-and-rear direction are formed at respective connection portions between the angled wall portions 62B and the pair of side wall portions 62C.

The side wall portions 58C at the two sides of the upper panel 58 and the side wall portions 62C at the two sides of the lower panel 62 are respectively joined in superposed states by welding or the like. Thus, a partition wall portion 66 is formed by the side wall portions 58C and 62C that are disposed at the vehicle width direction inner side of the outer side collision-absorbing portion 50B. The partition wall portion 66 extends in the vehicle front-and-rear direction and partitions the interior of a closed cross-section 68 of the collision-absorbing member 50 in the vehicle width direction, into plural spaces 68A and 68B. The angled wall portion 58B and angled wall portion 62B that are at the vehicle width direction inner side are required for the partition wall portion 66. Thus, closed cross-sections that enclose the spaces 68A and 68B are formed by the inner side collision-absorbing portion 50A and the outer side collision-absorbing portion 50B, respectively.

The partition wall portion 66 is disposed at the vehicle width direction outer side relative to a vehicle width direction central portion of the collision-absorbing member 50. Therefore, a width WB (a length in the vehicle width direction) of the outer side collision-absorbing portion 50B is smaller than a width WA of the inner side collision-absorbing portion 50A. In addition, a number of the ridge lines 60 and 64 at the outer side collision-absorbing portion 50B is greater than a number of the ridge lines 56 at the inner side collision-absorbing portion 50A. Thus, the compression strength of the outer side collision-absorbing portion 50B is made higher than the compression strength of the inner side collision-absorbing portion 50A.

The side wall portions 58C and 62C that are disposed at the vehicle width direction outer side of the outer side collision-absorbing portion 50B form an outer side wall portion 50B1 of the vehicle width direction outer side of the outer side collision-absorbing portion 50B. As illustrated by two-dot chain lines, the front end 34F of the outer wall portion 34 of the load-bearing member 30 is disposed at the vehicle rear of the outer side wall portion 50B1. Thus, as shown in FIG. 1, the outer side wall portion 50B1 is disposed between the end portion 20A of the front bumper RF 20 and the front end 34F of the outer wall portion 34 of the load-bearing member 30. The front face 26A of the protrusion portion 26 of the reinforcing member 22, the outer side collision-absorbing portion 50B, and the front end 34F of the outer wall portion 34 of the load-bearing member 30 are arranged in line in the vehicle front-and-rear direction.

The meaning of "the front face 26A of the protrusion portion 26 of the reinforcing member 22, the outer side collision-absorbing portion 50B, and the front end 34F of the outer wall portion 34 of the load-bearing member 30 are arranged in line in the vehicle front-and-rear direction" as used herein is not limited to cases in which the front face 26A, the outer side collision-absorbing portion 50B and the front end 34F are disposed on a straight line in the vehicle front-and-rear direction but includes structures in which the same are offset a little in the vehicle width direction due to assembly errors or the like.

Now, operation of the present exemplary embodiment is described.

Figure 4:
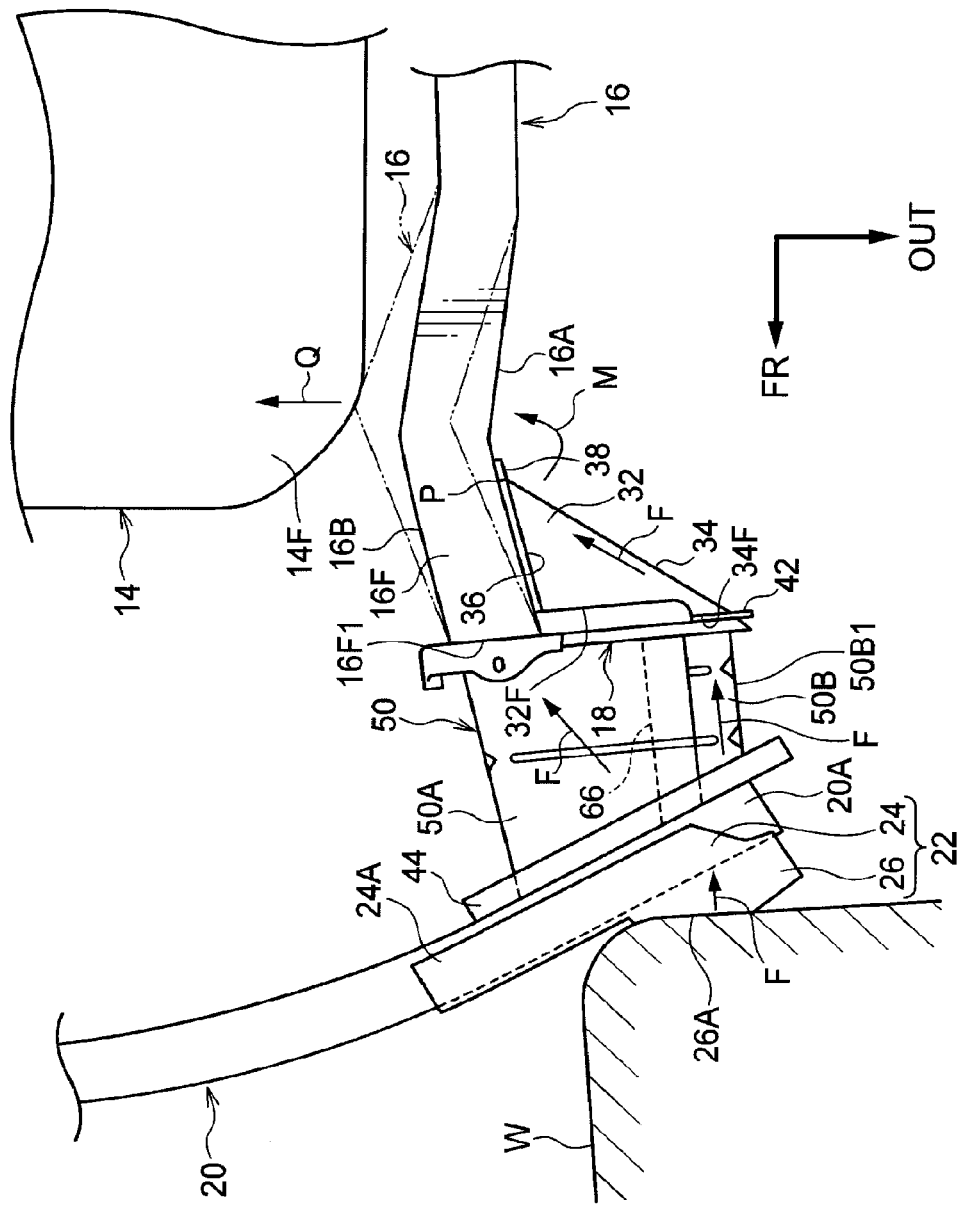
FIG. 4 is a plan view corresponding to FIG. 1, showing an example of a deformed state of a front side member associated with a micro-wrap collision.

As illustrated in FIG. 4, if a collision object W has a micro-wrap collision with the vehicle front portion 12, operation is, for example, as follows. A collision load F toward the vehicle rear is inputted from the collision object W to the front face 26A of the protrusion portion 26 of the reinforcing member 22. This collision load F is transmitted through the end portion 20A of the front bumper RF 20 to the collision-absorbing member 50. The collision load F that that is transmitted to the collision-absorbing member 50 is transmitted through the inner side collision-absorbing portion 50A of the collision-absorbing member 50 to the front end 16F1 of the front side member 16 and is transmitted through the outer side collision-absorbing portion 50B to the front end 34F of the outer wall portion 34 of the load-bearing member 30. At this time, collision energy is absorbed by the inner side collision-absorbing portion 50A and the outer side collision-absorbing portion 50B compressively deforming in the vehicle front-and-rear direction.

A collision load F that is transmitted to the front end 34F of the outer wall portion 34 of the load-bearing member 30 is transmitted through the outer wall portion 34 to the outer side face 16A of the front side member 16. At this time, a moment M is produced at a connection portion P between the rear end of the outer wall portion 34 and the outer side face 16A of the front side member 16. As a result, the front side member 16 inflects to the vehicle width direction inner side from the connection portion P, for example, as illustrated by the solid lines in FIG. 4. When an inflected portion of the front side member 16 touches against a front portion 14F of the power unit 14 as illustrated by the two-dot chain lines, a width direction load (a lateral load) Q toward the vehicle width direction inner side is produced in the power unit 14.

The load Q produced in the power unit 14 is dispersed and transmitted through the power unit 14 to the front side member and the like (not shown in the drawings) at the opposite side of the power unit 14 from the side at which the collision body W is disposed (i.e., to the vehicle right side). Because of the width direction load Q produced in the power unit 14, the vehicle front portion 12 slides in the vehicle width direction in the direction away from the collision object W (i.e., to the vehicle right side). As a result, deformation of a cabin (not shown in the drawings) that is formed at the vehicle rear of the power unit 14 is reduced. Thus, collision performance with respect to micro-wrap collisions is improved.

Now, if, for example, the compression strengths of the inner side collision-absorbing portion 50A and the outer side collision-absorbing portion 50B of the collision-absorbing member 50 were equal, a collision load F inputted to the front bumper RF 20 in association with a micro-wrap collision would be dispersed and transmitted through the collision-absorbing member 50 to the front end 16F1 of the front side member 16 and the front end 34F of the outer wall portion 34 of the load-bearing member 30. Therefore, the collision load F that would be transmitted from the collision-absorbing member 50 to the front end 34F of the outer wall portion 34 of the load-bearing member 30 would be reduced, and the moment M produced at the connection portion P between the rear end of the outer wall portion 34 and the outer side face 16A of the front side member 16 would be smaller. Hence, the front side member 16 might tend to deform less to the vehicle width direction inner side.

However, in the present exemplary embodiment the outer side collision-absorbing portion 50B of the collision-absorbing member 50 is higher in compression strength than the inner side collision-absorbing portion 50A. To be specific, as shown in FIG. 3, the outer side collision-absorbing portion 50B extends in the vehicle front-and-rear direction and includes the partition wall portion 66 that partitions the closed cross-section 68 of the collision-absorbing member 50 into the plural spaces 68A and 68B in the vehicle width direction. A closed cross-section is formed in the outer side collision-absorbing portion 50B by the partition wall portion 66. The width WB of the outer side collision-absorbing portion 50B is smaller than the width WA of the inner side collision-absorbing portion 50A. In addition, the number of the ridge lines 60 and 64 at the outer side collision-absorbing portion 50B is larger than the number of the ridge lines 56 at the inner side collision-absorbing portion 50A. Thus, the compression strength of the outer side collision-absorbing portion 50B is made higher than the compression strength of the inner side collision-absorbing portion 50A.

Consequently, in the present exemplary embodiment, a collision load F that is inputted to the end portion 20A of the front bumper RF 20 in association with a micro-wrap collision concentrates in and is transmitted through the outer side collision-absorbing portion 50B side. Therefore, in the present exemplary embodiment, the collision load F that is transmitted from the end portion 20A of the front bumper RF 20 through the outer side collision-absorbing portion 50B to the front end 34F of the outer wall portion 34 of the load-bearing member 30 is larger than in a structure in which the compression strengths of the inner side collision-absorbing portion 50A and the outer side collision-absorbing portion 50B are equal. Hence, the moment M that is produced at the connection portion P between the rear end of the outer wall portion 34 and the outer side face 16A of the front side member 16 is larger. Therefore, the front side member 16 tends to inflect more to the vehicle width direction inner side. Thus, the width direction load Q may be produced in the power unit 14 sooner. Therefore, collision performance with respect to micro-wrap collisions is improved.

In the present exemplary embodiment, the protrusion portion 26 that protrudes toward the vehicle front is provided at the end portion 20A of the front bumper RF 20, and the front face 26A of the protrusion portion 26 is formed as a flat surface extending in the vehicle up-and-down direction and the vehicle width direction. Therefore, in the present exemplary embodiment, a collision object W may be received by the front face 26A more efficiently than in a structure in which the front face 26A of the protrusion portion 26 is angled with respect to the vehicle up-and-down direction or the vehicle width direction.

As shown in FIG. 1, the front face 26A of the protrusion portion 26, the outer side collision-absorbing portion 50B, and the front end 34F of the outer wall portion 34 of the load-bearing member 30 are arranged in line in the vehicle front-and-rear direction. Therefore, a collision load F that is transmitted to the front face 26A of the protrusion portion 26 may be efficiently transmitted through the outer side collision-absorbing portion 50B and the outer wall portion 34 of the load-bearing member 30 to the outer side face 16A of the front side member 16.

The front end 34F of the outer wall portion 34 of the load-bearing member 30 is disposed at the vehicle rear of the outer side wall portion 50B 1 of the outer side collision-absorbing portion 50B. Consequently, a collision load F that is inputted to the end portion 20A of the front bumper RF 20 in association with a micro-wrap collision is transmitted through the outer side wall portion 50B1 of the outer side collision-absorbing portion 50B to the front end 34F of the outer wall portion 34. Therefore, the collision load F is efficiently transmitted from the outer side collision-absorbing portion 50B to the front end 34F of the outer wall portion 34.

The front end 32F of the projection portion 32 of the load-bearing member 30 is disposed with the gap G between the front end 32F and the bracket 18. In contrast, the front end 34F of the outer wall portion 34 of the load-bearing member 30 protrudes to the vehicle front relative to the front end 32F of the projection portion 32 and abuts against the rear face of the bracket 18.

Therefore, a collision load F that is transmitted from the front bumper RF 20 through the collision-absorbing member 50 to the bracket 18 is transmitted to the front end 34F of the outer wall portion 34 earlier than to the front end 32F of the projection portion 32 of the load-bearing member 30. Thus, the collision load F is transmitted through the outer wall portion 34 to the outer side face 16A of the front side member 16 even more efficiently.

In the present exemplary embodiment, the compression strength of the outer side collision-absorbing portion 50B may be made higher than the compression strength of the inner side collision-absorbing portion 50A by a simple structure, by the interior of the closed cross-section 68 of the collision-absorbing member 50 being partitioned by the partition wall portion 66. Moreover, the number of the ridge lines 60 and 64 at the outer side collision-absorbing portion 50B may be made greater than the number of the ridge lines 56 at the inner side collision-absorbing portion 50A easily, by the provision of the partition wall portion 66 of the outer side collision-absorbing portion 50B.

In the present exemplary embodiment, the inner side collision-absorbing portion 50A and the outer side collision-absorbing portion 50B are connected to one another in the vehicle width direction, and the cross-sectional shapes of the inner side collision-absorbing portion 50A and outer side collision-absorbing portion 50B viewed in the vehicle front-and-rear direction constitute the closed cross-section 68 that extends across the front end 16F1 of the front side member 16 and the front end 34F of the outer wall portion 34 of the load-bearing member 30. Therefore, compared to a structure in which the inner side collision-absorbing portion 50A and the outer side collision-absorbing portion 50B are separate bodies, in the present exemplary embodiment, an absorption amount of collision energy by the collision-absorbing member 50 may be assured even while a number of components is reduced.

To add to descriptions of the reinforcing member 22, in the present exemplary embodiment, the inner end portion 24A of the base portion 24 of the reinforcing member 22 protrudes to the vehicle width direction inner side relative to the bracket 44 and the collision-absorbing member 50. Thus, collision performance with respect to, for example, full-wrap collisions, is improved by the end portion 20A of the front bumper RF 20 being reinforced by the base portion 24.

Now, variant examples of the above exemplary embodiment are described.

In the exemplary embodiment described above, the partition wall portion 66 is provided at the outer side collision-absorbing portion 50B of the collision-absorbing member 50, but the above exemplary embodiment is not limited thus. Various kinds of reinforcing members that raise compression strength may be provided at the outer side collision-absorbing portion 50B such as, for example, ribs extending in the vehicle front-and-rear direction, a reinforcing plate or the like.

Figure 5:
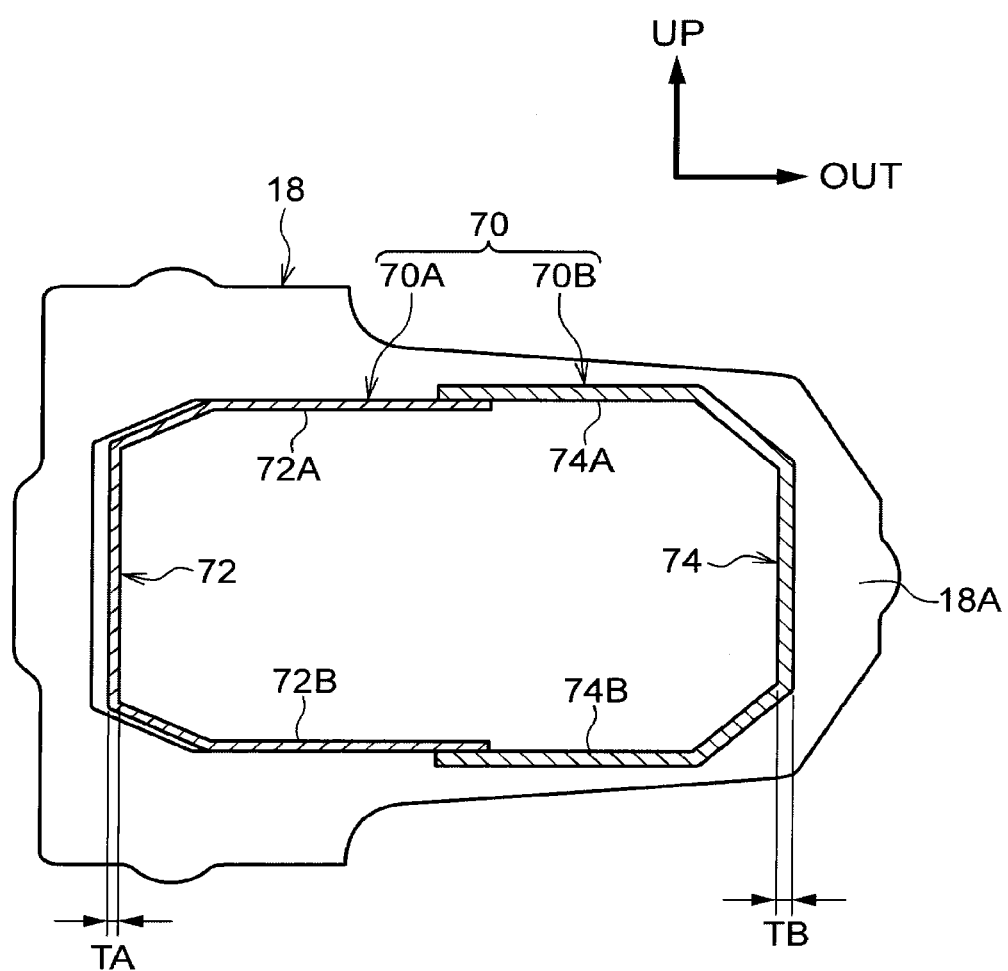
FIG. 5 is a magnified sectional diagram, corresponding with FIG. 3, showing a variant example of the collision-absorbing member shown in FIG. 1.

As a further example, as in a collision-absorbing member 70 illustrated in FIG. 5, the compression strength of an outer side collision-absorbing portion 70B may be made higher than the compression strength of an inner side collision-absorbing portion 70A by a plate thickness TB of the outer side collision-absorbing portion 70B being made thicker than a plate thickness TA of the inner side collision-absorbing portion 70A.

To be specific, a cross-sectional shape of the inner side collision-absorbing portion 70A viewed in the vehicle front-and-rear direction is formed by an inner panel 72 that forms a "C" shape, the vehicle width direction outer side of which is open. Meanwhile, a cross-sectional shape of the outer side collision-absorbing portion 70B viewed in the vehicle front-and-rear direction is formed by an outer panel 74 that forms a "C" shape, the vehicle width direction inner side of which is open.

The inner panel 72 and the outer panel 74 are joined together by respective upper wall portions 72A and 74A being welded to one another in a superposed state or the like and respective lower wall portions 72B and 74B being welded to one another in a superposed state or the like. Thus, a closed cross-section is formed by the inner panel 72 and the outer panel 74.

The inner panel 72 and the outer panel 74 are formed of, for example, the same metal material or the like. The plate thickness TB of the outer side collision-absorbing portion 70B (the outer panel 74) is greater than the plate thickness TA of the inner side collision-absorbing portion 70A (the inner panel 72). Therefore, the compression strength of the outer side collision-absorbing portion 70B is higher than the compression strength of the inner side collision-absorbing portion 70A. Thus, in the present variant example, the compression strength of the outer side collision-absorbing portion 70B may be made higher than the compression strength of the inner side collision-absorbing portion 70A by a simple structure. As a further example, the compression strength of the outer side collision-absorbing portion 70B may be made higher than the compression strength of the inner side collision-absorbing portion 70A by the outer side collision-absorbing portion 70B being formed of a higher strength material than the inner side collision-absorbing portion 70A.

Figure 6:
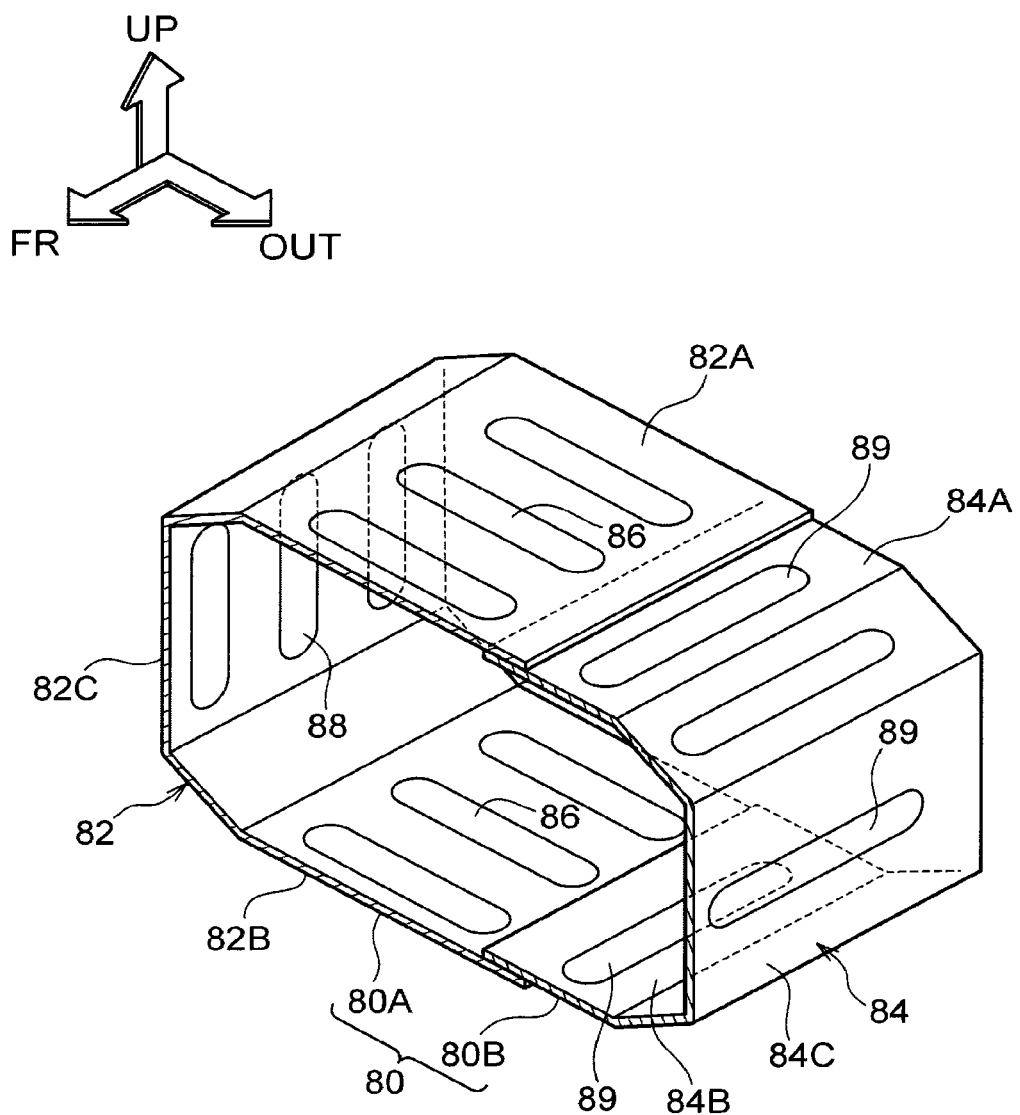
FIG. 6 is a perspective view showing another variant example of the collision-absorbing member shown in FIG. 1.

To continue, in a collision-absorbing member 80 illustrated in FIG. 6, the compression strength of an outer side collision-absorbing portion 80B is higher than the compression strength of an inner side collision-absorbing portion 80A because of the orientations of beads formed at the inner side collision-absorbing portion 80A and the outer side collision-absorbing portion 80B.

To be specific, an inner panel 82 forms the inner side collision-absorbing portion 80A. A plural number of width direction beads 86 that extend in the vehicle width direction are formed at an upper wall portion 82A and a lower wall portion 82B of the inner panel 82, and a plural number of up-and-down direction beads 88 that extend in the vehicle up-and-down direction are formed at an inner side wall portion 82C of the inner panel 82. These width direction beads 86 and up-and-down direction beads 88 originate a compressive deformation in the vehicle front-and-rear direction (an axial direction) of the inner side collision-absorbing portion 80A.

In contrast, front-and-rear direction beads 89 that extend in the vehicle front-and-rear direction are formed at an upper wall portion 84A, a lower wall portion 84B and an outer side wall portion 84C of an outer panel 84. The front-and-rear direction beads 89 provide resistance to compressive deformation of the outer side collision-absorbing portion 80B in the vehicle front-and-rear direction. Thus, the compression strength of the outer side collision-absorbing portion 80B is raised.

Thus, in the present variant example, the compression strength of the outer side collision-absorbing portion 80B may be made higher than the compression strength of the inner side collision-absorbing portion 80A by the width direction beads 86 and the up-and-down direction beads 88 being formed at the inner side collision-absorbing portion 80A while the front-and-rear direction beads 89 are formed at the outer side collision-absorbing portion 80B.

Alternatively, the compression strength of the outer side collision-absorbing portion 80B may be made higher than the compression strength of the inner side collision-absorbing portion 80A by the front-and-rear direction beads 89 being formed at the outer side collision-absorbing portion 80B but the width direction beads 86 and the up-and-down direction beads 88 being omitted from the inner side collision-absorbing portion 80A. Conversely, the compression strength of the outer side collision-absorbing portion 80B may be made higher than the compression strength of the inner side collision-absorbing portion 80A by one or both of the width direction beads 86 and the up-and-down direction beads 88 being formed at the inner side collision-absorbing portion 80A but the front-and-rear direction beads 89 being omitted from the outer side collision-absorbing portion 80B.

Figure 7:
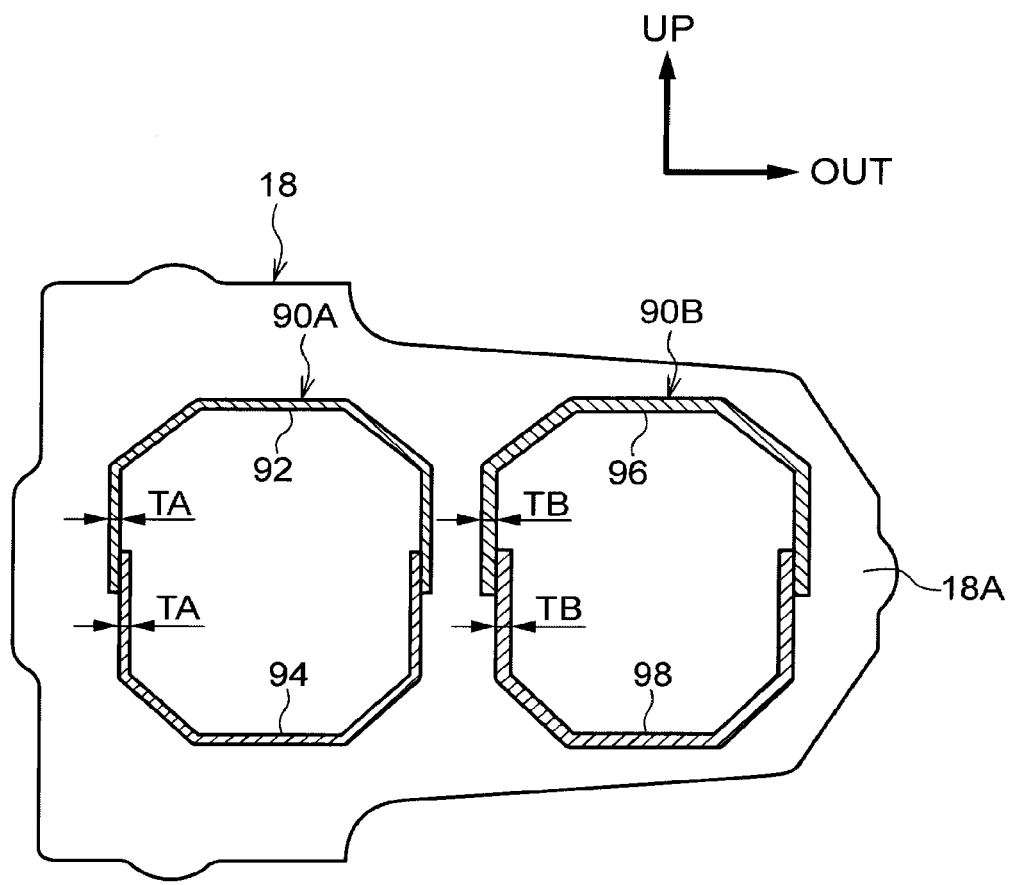
FIG. 7 is a magnified sectional diagram, corresponding with FIG. 3, showing another variant example of the collision-absorbing member shown in FIG. 1.

In the collision-absorbing member 50 according to the exemplary embodiment described above, the inner side collision-absorbing portion 50A and the outer side collision-absorbing portion 50B are connected to one another in the vehicle width direction, but the above exemplary embodiment is not limited thus. For example, as in the variant example illustrated in FIG. 7, an inner side collision-absorbing portion 90A and an outer side collision-absorbing portion 90B may be formed as separate bodies.

To be specific, a cross-sectional shape of the inner side collision-absorbing portion (inner side collision-absorbing member) 90A viewed in the vehicle front-and-rear direction constitutes a closed cross-section. The inner side collision-absorbing portion 90A is divided in the vehicle up-and-down direction to include an upper panel 92 and a lower panel 94. Similarly, a cross-sectional shape of the outer side collision-absorbing portion (outer side collision-absorbing member) 90B viewed in the vehicle front-and-rear direction constitutes a closed cross-section. The outer side collision-absorbing portion 90B is divided in the vehicle up-and-down direction to include an upper panel 96 and a lower panel 98. A plate thickness TB of the upper panel 96 and the lower panel 98 is set to be thicker than a plate thickness TA of the upper panel 92 and lower panel 94 of the inner side collision-absorbing portion 90A. Therefore, the compression strength of the outer side collision-absorbing portion 90B is higher than the compression strength of the inner side collision-absorbing portion 90A.

In this variant example, because the inner side collision-absorbing portion 90A and outer side collision-absorbing portion 90B are separate bodies, regulation of, for example, a collision load that is transmitted through the inner side collision-absorbing portion 90A to the front end 16F1 of the front side member 16 and a collision load that is transmitted through the outer side collision-absorbing portion 90B to the front end 34F of the outer wall portion 34 of the load-bearing member 30 is simple.

In the exemplary embodiment described above, the outer side wall portion 50B1 of the outer side collision-absorbing portion 50B is disposed between the end portion 20A of the front bumper RF 20 and the front end 34F of the outer wall portion 34 of the load-bearing member 30, but the above exemplary embodiment is not limited thus. The disposition of the outer side collision-absorbing portion 50B, the width WB (see FIG. 3) and the like may be appropriately modified providing at least a portion of the outer side collision-absorbing portion 50B is disposed between the front bumper RF 20 and the front end 34F of the outer wall portion 34 of the load-bearing member 30.

In the exemplary embodiment described above, the front end 34F of the outer wall portion 34 of the load-bearing member 30 is joined to the bracket 18, but the front end 34F need not be joined to the bracket 18. Further, in the exemplary embodiment described above, the front end 34F of the outer wall portion 34 abuts against the bracket 18, but there may be a gap between the front end 34F of the outer wall portion 34 and the bracket 18, within a range such that a collision load F can be transmitted.

In the exemplary embodiment described above, the gap G is opened between the front end 32F of the projection portion 32 of the load-bearing member 30 and the bracket 18, but the front end 32F of the projection portion 32 may be abutted against the bracket 18. The disposition, planar shape and the like of the load-bearing member 30 may be modified as appropriate.

In the exemplary embodiment described above, the outer wall portion 34 of the load-bearing member 30 serves as the load transmission portion, but the above exemplary embodiment is not limited thus. For example, the load transmission portion may be ribs that are provided at the load-bearing member and that protrude to the vehicle width direction outer side and the vehicle front from the outer side face 16A of the front side member 16, or the like.

In the exemplary embodiment described above, the front face 26A of the protrusion portion 26 of the reinforcing member 22 is formed as a flat surface that extends in the vehicle up-and-down direction and the vehicle width direction, but the front face 26A of the protrusion portion 26 may be angled with respect to the vehicle up-and-down direction and/or the vehicle width direction. Further, the protrusion portion 26 may be omitted. The reinforcing member 22 too may be admitted.

The load-bearing member 30 and the collision-absorbing member 50 according to the exemplary embodiment described above may be employed in one or both of the pair of front side members 16.

Hereabove, the present invention has been described in accordance with the exemplary embodiment, but the present invention is not limited by this exemplary embodiment. The exemplary embodiment and various variant examples may be used in suitable combinations, and it will be clear that numerous modes may be embodied within a technical scope not departing from the gist of the present invention.

What is claimed is:

1. A vehicle front portion structure comprising:
   a front side member disposed along a vehicle front-and-rear direction at a vehicle width direction outer side of a power unit;
   a load-bearing member provided at an outer side face of the vehicle width direction outer side of the front side member, the load-bearing member including a load transmission portion that protrudes to the vehicle width direction outer side and to a vehicle front from the outer side face;
   a front bumper reinforcement disposed along the vehicle width direction at the vehicle front of the front side member and the load-bearing member;
   an inner side collision-absorbing portion that couples the front end of the front side member with the front bumper reinforcement; and an outer side collision-absorbing portion disposed at the vehicle width direction outer side of the inner side collision-absorbing portion, an outer side wall portion of the vehicle width direction outer side of the outer side collision-absorbing portion being disposed between a front end of the load transmission portion and a vehicle width direction end portion of the front bumper reinforcement, and the outer side collision-absorbing portion being higher in compression strength in the vehicle front-and-rear direction than the inner side collision-absorbing portion, wherein the load-bearing member includes a projection portion that, viewed in the vehicle up-and-down direction, projects to the vehicle width direction outer side from the outer side face of the front side member, and that is disposed with a gap between a front end of the projection portion, and a portion of the inner side collision-absorbing portion at an outer side of the front side member in the vehicle width direction.

2. The vehicle front portion structure according to claim 1, wherein the inner side collision-absorbing portion and the outer side collision-absorbing portion are connected to one another in the vehicle width direction, a cross-sectional shape of the inner side collision-absorbing portion and the outer side collision-absorbing portion viewed in the vehicle front-and-rear direction constituting a closed cross-section that extends across the front end of the front side member and the front end of the load transmission portion.

3. The vehicle front portion structure according to claim 2, wherein the outer side collision-absorbing portion includes a partition wall portion that extends in the vehicle front-and-rear direction and partitions an interior of the closed cross-section into a plurality of spaces in the vehicle width direction.

4. The vehicle front portion structure according to claim 1, wherein:
a protrusion portion is provided at an end portion of the vehicle width direction outer side of the front bumper reinforcement, the protrusion portion protruding to the vehicle front, and a front face of the protrusion portion being a flat surface that extends in the vehicle up-and-down direction and the vehicle width direction, and
the front face of the protrusion portion, the outer side collision-absorbing portion, and the front end of the load transmission portion are arranged in line in the vehicle front-and-rear direction.

5. The vehicle front portion structure according to claim 1, further comprising a bracket that extends to the vehicle width direction outer side from the front end of the front side member, wherein:
the load transmission portion is an outer wall portion of the vehicle width direction outer side of the load-bearing member, the front end of the load transmission portion protrudes to the vehicle front relative to the front end of the projection portion, and the front end of the load transmission portion abuts against the bracket.

6. The vehicle front portion structure according to claim 1, wherein a number of ridge lines extending in the vehicle front-and-rear direction is greater at the outer side collision-absorbing portion than at the inner side collision-absorbing portion.

7. The vehicle front portion structure according to claim 1, wherein a plate thickness is greater at the outer side collision-absorbing portion than at the inner side collision-absorbing portion.

8. A vehicle front portion structure comprising:
a front side member disposed along a vehicle front-and-rear direction at a vehicle width direction outer side of a power unit;
a load-bearing member provided at an outer side face of the vehicle width direction outer side of the front side member, the load-bearing member including a load transmission portion that protrudes to the vehicle width direction outer side and to a vehicle front from the outer side face;
a front bumper reinforcement disposed along the vehicle width direction at the vehicle front of the front side member and the load-bearing member;
an inner side collision-absorbing portion that couples a front end of the front side member with the front bumper reinforcement;
an outer side collision-absorbing portion disposed at the vehicle width direction outer side of the inner side collision-absorbing portion, at least a portion of the outer side collision-absorbing portion being disposed between a front end of the load transmission portion and the front bumper reinforcement, and the outer side collision-absorbing portion being higher in compression strength in the vehicle front-and-rear direction than the inner side collision-absorbing portion; and
a bracket that extends to the vehicle width direction outer side from the front end of the front side member, wherein:
the load-bearing member includes a projection portion that, viewed in the vehicle up-and-down direction, projects to the vehicle width direction outer side from the outer side face of the front side member, and that is disposed with a gap between a front end of the projection portion and the bracket, and
the load transmission portion is an outer wall portion of the vehicle width direction outer side of the load-bearing member, the front end of the load transmission portion protrudes to the vehicle front relative to the front end of the projection portion, and the front end of the load transmission portion abuts against the bracket.

* * * * *